United States Patent
Hatakeyama et al.

[11] Patent Number: 6,081,362
[45] Date of Patent: Jun. 27, 2000

[54] OPTICAL RECEIVER CAPABLE OF RESPONDING TO BOTH BURST AND CONTINUOUS SIGNALS

[75] Inventors: Ichiro Hatakeyama; Takeshi Nagahori, both of Tokyo, Japan

[73] Assignee: NEC Corporation, Tokyo, Japan

[21] Appl. No.: 08/951,603

[22] Filed: Oct. 17, 1997

[30] Foreign Application Priority Data

Oct. 18, 1996 [JP] Japan .................................. 8-276700

[51] Int. Cl.[7] .......................... H04B 10/06; H04B 10/00; H03L 5/00; H04L 25/06
[52] U.S. Cl. .......................... 359/189; 359/189; 359/161; 327/309; 375/317
[58] Field of Search .................................. 359/189, 161; 327/309; 375/317

[56] References Cited

U.S. PATENT DOCUMENTS

| | | | |
|---|---|---|---|
| 4,257,125 | 3/1981 | Theall, Jr. | 455/608 |
| 5,475,342 | 12/1995 | Nakamura et al. | 330/136 |
| 5,636,048 | 6/1997 | Kogure et al. | 359/189 |

Primary Examiner—Leslie Pascal
Assistant Examiner—Mohammad Sedighian
Attorney, Agent, or Firm—Whitham, Curtis & Whitham

[57] ABSTRACT

An optical receiver can operate in response to an input optical signal to produce an output electrical signal. The optical receiver comprises a photo diode (340) for transducing the input optical signal into an electrical signal, a plurality of limit amplifier circuits (310-1, 310-2, ..., and 310-n) which are connected in series which are connected in series to one another and which have offset compensation functions determined by controllable offset compensation time constants, respectively. The plurality of limit amplifier circuits amplify the electrical signal to produce an amplified and controlled electrical signal in dependency upon the offset compensation time constants controlled. The optical receiver further comprises adjusting circuits (320-1, 320-2, ..., and 320-n) connected to the limit amplifier circuits for adjusting at least one of the offset compensation time constants to make the limit amplifier circuits produce the amplified and controlled electrical signal and an output terminal OUT for producing the amplified and controlled electrical signal as the output electrical signal.

23 Claims, 8 Drawing Sheets

OPTICAL RECEIVER CAPABLE OF RESPONDING TO BOTH BURST AND CONTINUOUS SIGNALS

BACKGROUND OF THE INVENTION

This invention relates to an optical receiver used for a digital optical transmission system.

A conventional optical receiver of the type described is classified into a first optical receiver for receiving a burst signal and a second optical receiver for receiving a continuous signal. The first optical receiver for the burst signal comprises a photo diode and a plurality of limit amplifier circuits connected In series to one another. Each limit amplifier circuit has an offset compensating function determined by an offset compensation time constant. Disclosure is made about such an optical receiver comprising the plurality of limit amplifier circuits, for example, in Japanese Unexamined Patent Publication (JP-A) No.310967/1994, Japanese Unexamined Patent Publication (JP-A) No. 84160/1996, or Proceedings of the 1996 IEICE (THE INSTITUTE OF ELECTRONICS, INFORMATION AND COMMUNICATION ENGINEERS) General Conference C-588. Because the optical receiver capable in response to the burst signal is required to carry out offset compensation at a high speed, the offset compensation time constant of each of the limit amplifier circuits is set to a small value.

On the other hand, the second conventional optical receiver for receiving only a continuous signal has a preamplifier which is connected to a post-amplifier through a coupling capacitor for unipolar-to-bipolar transformation. The post amplifier comprises a plurality of limit amplifier circuits connected in series to one another. Furthermore, the post amplifier compensates internal offset of its circuit by having a negative feedback circuit which has an integrating circuit and which maintains a time average value of positive and negative outputs at a constant value.

SUMMARY OF THE INVENTION it is an object of this invention to provide an optical receiver which is capable of receiving both of burst and continuous signals and which has high sensitivity for the continuous signal with a small size and a low cost.

It is another object of this invention to provide the optical receiver which is implemented by a semiconductor integrated circuit with simple design and simple manufacturing.

According to this invention, there is provided an optical receiver which operable in response to an input optical signal to produce an output electrical signal and which comprises a photoelectric transducer for transducing the input optical signal into an electrical signal, a plurality of limit amplifier circuits which are connected in series to one another and which have offset compensation functions determined by controllable offset compensation time constants, respectively, the plurality of limit amplifier circuits amplifying the electrical signal to produce an amplified and controlled electrical signal in dependency upon the offset compensation time constants controlled, adjusting means connected to the plurality of limit amplifier circuits for adjusting at least one of the offset compensation time constants to make the limit amplifier circuits produce the amplified and controlled electrical signal, and output means for producing the amplified and controlled electrical signal as the output electrical signal.

According to this invention, there is provided an optical receiver which operable in response to an input optical signal to produce an output electrical signal and which comprise a photoelectric transducer for transducing the input optical signal into an electrical signal, first through n-th limit amplifier circuits which are connected in series to one another to form first through n-th connection stages, respectively, and which have offset compensation functions determined by offset compensation time constants, the first through the n-th limit amplifier circuits amplifying the electrical signal supplied to one of the first through the n-th limit amplifier circuit to produce an amplified electrical signal through the n-th limit amplifier circuits, selecting means supplied with the electrical signal and coupled to the first through the n-th limit amplifier circuits for selecting one of the first through the n-th limit amplifier circuits as a selected limit amplifier circuit to change the number of the limit amplifier circuits between the selected limit amplifier circuit and the n-th limit amplifier circuit and to deliver the electrical signal to the selected limit amplifier circuit, and output means for delivering the output electrical signal from the n-th limit amplifier circuit by amplifying the electrical signal between the selected limit amplifier circuit and the n-th limit amplifier circuit.

DESCRIPTION OF THE PREFERRED EMBODIMENTS

In order to facilitate an understanding of this invention, description will at first be made about first and second conventional optical receivers with reference to the drawings.

Figure 1:
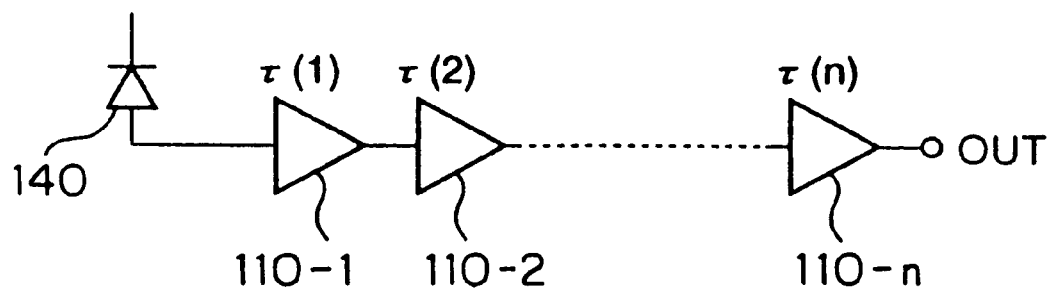
FIG. 1 is a block diagram of a conventional optical receiver for a burst signal.

Referring to FIG. 1, the first conventional optical receiver for a burst signal comprises a photo diode 140 and a plurality of limit amplifier circuits 110-1, 110-2, 110-3, . . . , 110-n connected in series to one one another. Each limit amplifier circuit has an offset compensating function determined by an offset compensation time constant of the such an offset compensation time constant is set to a predetermined value in each of the limit amplifier circuits. The offset compensation time constants of the limit amplifier circuits 110-1, 110-2, 110-3, . . . , 110-n are give by τ(1), τ(2), τ(3), . . . , τ(n), respectively. Such an optical receiver illustrated in FIG. 1 disclosed in the references mentioned in the preamble of the instant specification and should carry out an offset compensation at a high speed so as to respond to the burst signal. In this condition, the offset compensation time constants In the limit amplifier circuits are very small in consideration of so as receive continuation of a predetermined bits having the same polarity.

Figure 2:
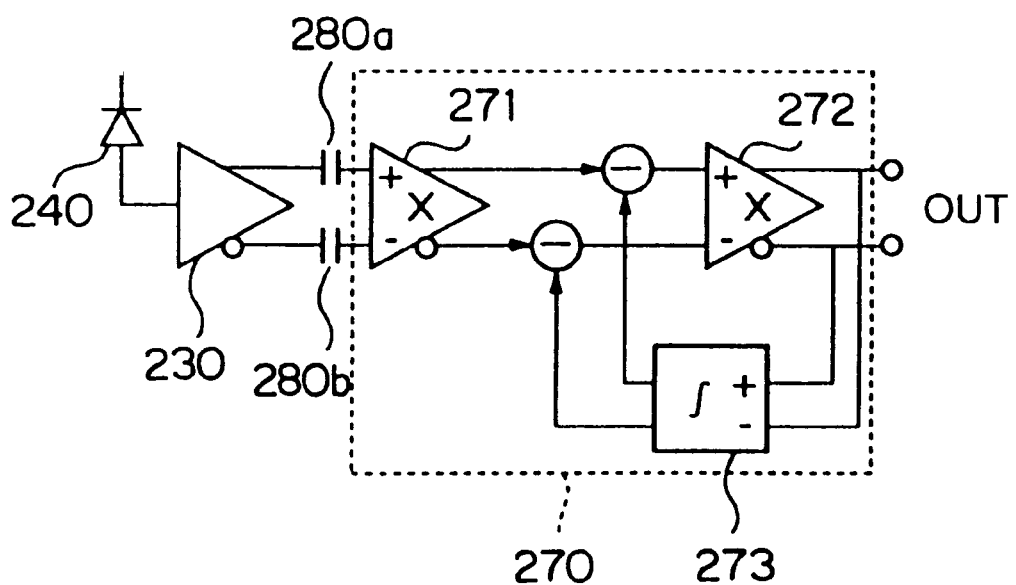
FIG. 2 is a block diagram of a conventional optical receiver for a continuous signal.

Referring to FIG. 2, in the second conventional optical receiver responding to a continuous signal only is structured by a photo diode 240, a preamplifier 230 of a differential type, and a post amplifier 270. With this structure, a pair of outputs of the preamplifier 230 is led to the post-amplifier 270 through coupling capacitors 280a and 280b. In this case, each of the coupling capacitors 280a and 280b serves to carry out unipolar-to-bipolar transformation. On the other hand, the post-amplifier 270 comprises limit amplifier circuits 271 and 272 connected in series to each other through subtracters (unnumbered). The post-amplifier 270 compensates an internal offset thereof by having a negative feedback circuit which includes an integrating circuit 273. The integrating circuit 273 is operable to maintain a time average value of positive and negative outputs at a constant value.

A PON (Passive Optical Network) system is well known as an optical subscriber system which is able to economically realize a narrow band service such as a telephone service. Recently, the PON system is enable to adapted in a field of optical communication. Furthermore, a single star system is also known as an effective method which realizes a wide band system by the use of existing resources utilized in the PON system. The single star system is described in 1995 IEICE Technical Report SSE95-140.

Thus, the PON system is upgraded stepwise into the single star system. During this step, the existing resources of the PON system are used in common to the single star system. In other words, a system which comprises both the PON and the single star systems is existent before the completion of a complete single star system. In this event, consideration should be made about the fact that both the burst signal and the continuous signal coexist in an upstream link of such a system. This is because the burst signal is transmitted from an existing an ONU (Optical Network Unit) while the continuous signal with low power is transmitted from each new subscriber. Under the circumstance, such a system necessitates two types of optical receivers one of which is able to receive the burst signal with relatively low sensitivity and the other of which is able to receive the continuous signal with high sensitivity. In addition, both types of the optical receivers are preferably small in size and inexpensive in cost.

Herein, it is to be noted that the optical receiver for the burst signal generally can also be used to receive the continuous signal. However, when the optical receiver for the burst signal is used to receive the continuous signal, threshold control of received signal has been degraded in accuracy in comparison with the optical receiver designed to receive the continuous signal alone. This brings about a reduction of receiver sensitivity of the continuous signal.

This is because the optical receiver for the burst signal is small in the offset compensation time constant and large in a detecting error of an offset detector, such as a peak detecting circuit. The optical receiver is susceptible to an influence of an electro-magnetic interference.

For example, the conventional optical receiver illustrated in FIG. 1 compensates an internal offset thereof by connecting, in series, a plurality of limit amplifier circuits having offset compensating function in order to accomplish a quick response.

However, the offset compensation is practically insufficient with this structure because restriction is imposed on connected in series. Therefore, provision should be made about individual offset adjustment, a stabilizing circuit of a large scale for a power supply circuit, and a magnetic shield in order to achieve high sensitivity. However, such an optical receiver for the burst signal becomes large in scale and expensive in cost as composed with the optical receiver for the continuous signal.

On the other hand, as a new technology applied to an optical fiber transmission system, there is a multichannel optical link which uses a ribbon fiber cable and an array optical receiver. The multichannel optical link has a possibility that is applied to the technical field, such as an interconnection or a LAN (a Local Area Network).

In such a technical field, the optical receiver should have both two properties different from each other. One of the properties is to have a middle speed response to the burst signal together with wide phase margin necessary for signal decision. Another property is to have a very high speed response to the continuous signal and relatively high sensitivity. Moreover, the optical receiver in the field should be small in size and low in cost.

However, the optical receiver illustrated in FIG. 1 and the optical receiver illustrated in FIG. 2 are completely different in structure from each other. Therefore, one of the two optical receivers illustrated in FIGS. 1 and 2 cannot replaced by each other by only changing parts of their components.

Now, description will be made about an optical receiver according to preferred embodiments of this invention.

First Embodiment

Figure 3:
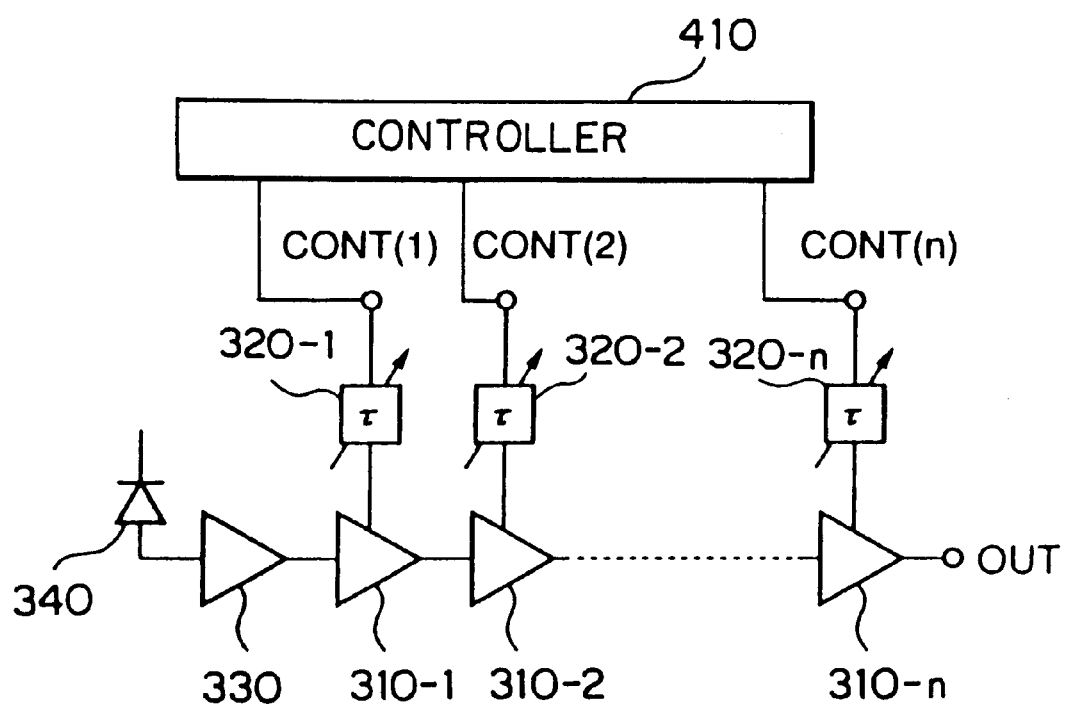
FIG. 3 is a block diagram of an optical receiver according to a first embodiment of this invention.

Referring to FIG. 3, an optical receiver according to a first embodiment of this invention is supplied with an input optical signal. The optical receiver comprises a photo diode 340 as a photoelectric transducer for transducing the input optical signal into an electrical signal, a preamplifier 330 for amplifying the electrical signal produced from the photo diode 340 into a preamplified electrical signal, and a plurality of limit amplifier circuits 310-1, 310-2, . . . , and 310-n which are connected in series to one another and which have offset compensation functions,where n is a natural number greater than unity. The limit amplifier circuits 310-1 to 310-n successively amplify the preamplified electrical signal supplied from the preamplifier 330 to produce an amplified electrical signal through an output terminal OUT.

The optical receiver further comprises a plurality of adjusting circuits 320-1, 320-2, . . . , and 320-n connected to the plurality of limit amplifier circuits 310-1 to 310-n, respectively. Each of adjusting circuits 320-1 to 320-n serves to adjust an offset compensation time constant in each of the limit amplifier circuits 310-1 to 310-n. The plurality of the adjusting circuits 320-1 to 320-n may collectively be called an adjusting unit.

The adjusting circuits 320-1, 320-2, . . . , and 320-n have control ports CONT(1), CONT(2), . . . , and CONT(n), respectively, which are connected to a controller 410. The offset compensation time constant in each of the limit amplifier circuits 310-1 to 310-n is changed by a control signal supplied from the controller 410 to each of the control ports CONT(1) to CONT(n).

For example, each of the offset compensation time constants is set to a small value so as to receive the burst signal and to realize a high speed response.

On the other hand, each of the offset compensation time constants is set to a large value so as to receive the continuous signal which should be received with high sensitivity. As a result, the optical receiver can carry out the offset compensation with high accuracy and therefore has high sensitivity.

Second Embodiment

Figure 4:
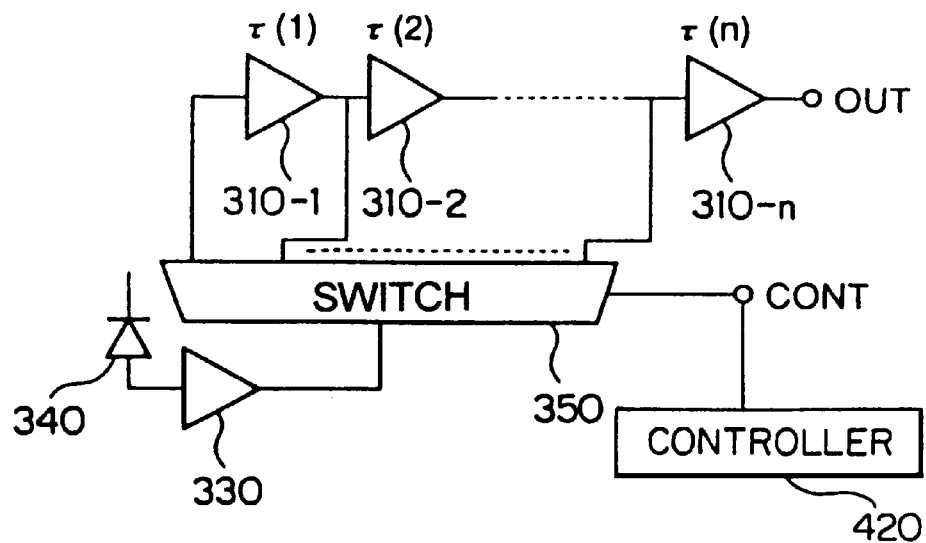
FIG. 4 is a block diagram of an optical receiver according to a second embodiment of this invention.

Referring to FIG. 4, an optical receiver according to a second embodiment of this invention is also supplied with an input optical signal like in the first embodiment. The optical receiver is similar to that illustrated in FIG. 3 except that an analog switch unit 350 is used as a selecting unit in place of the plurality of adjusting circuits 320-1 to 320-n illustrated in FIG. 3. In the example illustrated in FIG. 4, the limit amplifier circuits 310-1 to 310-n has connection stages equal to in number to n.

In this connection, the limit amplifier circuits 310-1 to 310-n may collectively be called an n-stage limit amplifier circuit. As will shortly be described, the analog switch unit 350 is operable to change the number of the connection stages from one to another.

Specifically, the analog switch unit 350 which has a single input part supplied from the preamplifier 330 with the preamplified electrical signal and a plurality of output ports, n in number, selectively supplied with the preamplified electrical signal to send the same to one of the limit amplifier circuits 310-1 to 310-n in response to a control signal supplied from a controller 420 through a control port CONT.

In the illustrated example, each of the limit amplifier circuits 310-1 to 310-n is Implemented by a differential amplifier. In this connection, the analog switch unit 350 supplies differential output signals, namely, a pair of output signals to each limit amplifier circuit 310-1 to 310-n. If each of the limit amplifier circuits 310-1 to 310-n is structured by an amplifier operable in response to a single input signal instead of the differential amplifier, the analog switch unit 350 may produce a single output signal.

The limit amplifier circuits 310-1, 310-2, ..., and 310-n have offset compensation time constants τ(1), τ(2), ..., and τ(n), respectively. In this case, a relationship between two adjacent one of the offset compensation time constants is defined by the following inequality represented by:

$$\tau(j) > \tau(j+1),$$

where j represents a positive integer smaller than n.

Herein, let the optical receiver be used for receiving the burst signal. In this case, the analog switch unit 350 carries out the selecting operation so that the preamplified electrical signal is supplied to one of the limit amplifier circuits 310-1 to 310-n that may be arranged relatively rearwards of the connection stages in the vicinity of the output terminals OUT. According to the selecting operation mentioned above, the optical receiver has the offset compensation time constant of a small value and is formed by a small number of the connection stages. For example, when the preamplified electrical signal is assumed to be supplied to the limit amplifier circuit 310-(n-1), the number of the connection stages becomes equal to two. In this event, the preamplified electrical signal is amplified by both the limit amplifier circuits 310-(n-1) and 310-n As a result, the optical receiver is operable at a high speed and serves an optical receiver for the burst signal.

In the case that the optical receiver is used for the continuous signal, the analog switch unit 350 should carry out the selecting operation so that the preamplified electrical signal is supplied to relatively forward one of the limit amplifier circuits 310-1 to 310-n that may be arranged relatively forwards of the connection stages. According to this selecting operation, the preamplified electrical signal which is delivered through the analog switch unit 350 is amplified through a large number of the limit amplifier circuits. In this case, the optical receiver has the offset compensation time constant of a large value and the large number of the connection stages. For example, when the preamplified electrical signal is supplied to the limit amplifier circuit 310-2, the number of the connection stage becomes equal to (n-1). In this event, the preamplified electrical signal is amplified by the limit amplifier circuits 310-2 to 310-n. As a result, the optical receiver can compensate the offset with high accuracy.

Third Embodiment

Figure 5:
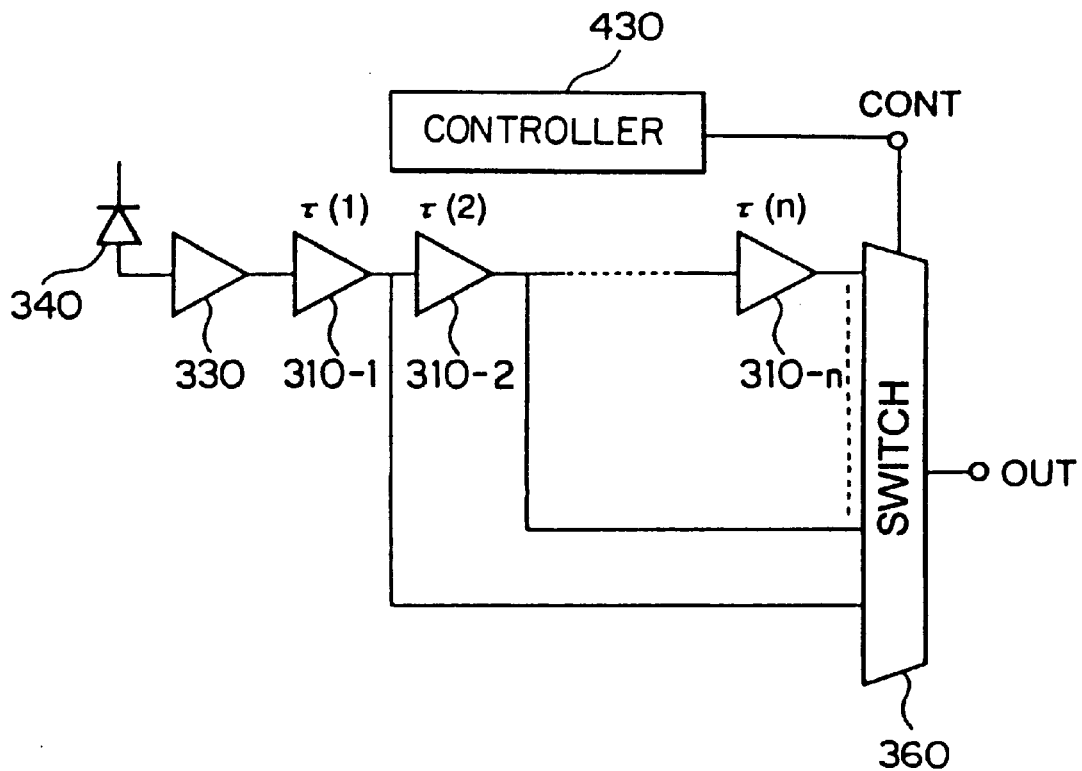
FIG. 5 is a block diagram of an optical receiver according to a third embodiment of this invention.

Referring to FIG. 5, an optical receiver according to a third embodiment of this invention is similar to that illustrated in FIG. 4 except that an analog switch unit 360 is connected to output sides of the limit amplifier circuits 310-1 to 310-n connected in series to one another and is given output signals from the limit amplifier circuits 310-1 to 310-n.

In this connection, the analog switch unit 360 has a plurality of input ports connected to the output sides of the limit amplifier circuits 310-1 to 310-n, respectively. With this structure, the analog switch unit 360 selectively delivers one of the output signals of the limit amplifier circuits 310-1 to 310-n as the amplified electrical signal in response to a control signal supplied through a control port CONT sent from a controller 430.

In the illustrated example, the analog switch unit 360 is given differential input signals (a pair of input signals) from each of the limit amplifier circuits 310-1 to 310-n because each limit amplifier circuit 310-1 to 310-n comprises the differential amplifier. If each of the limit amplifier circuits 310-1 to 310-n is structured by an amplifier which produces a single output signal, the analog switch unit 360 is operable in response to a single input signal.

Figure 6:
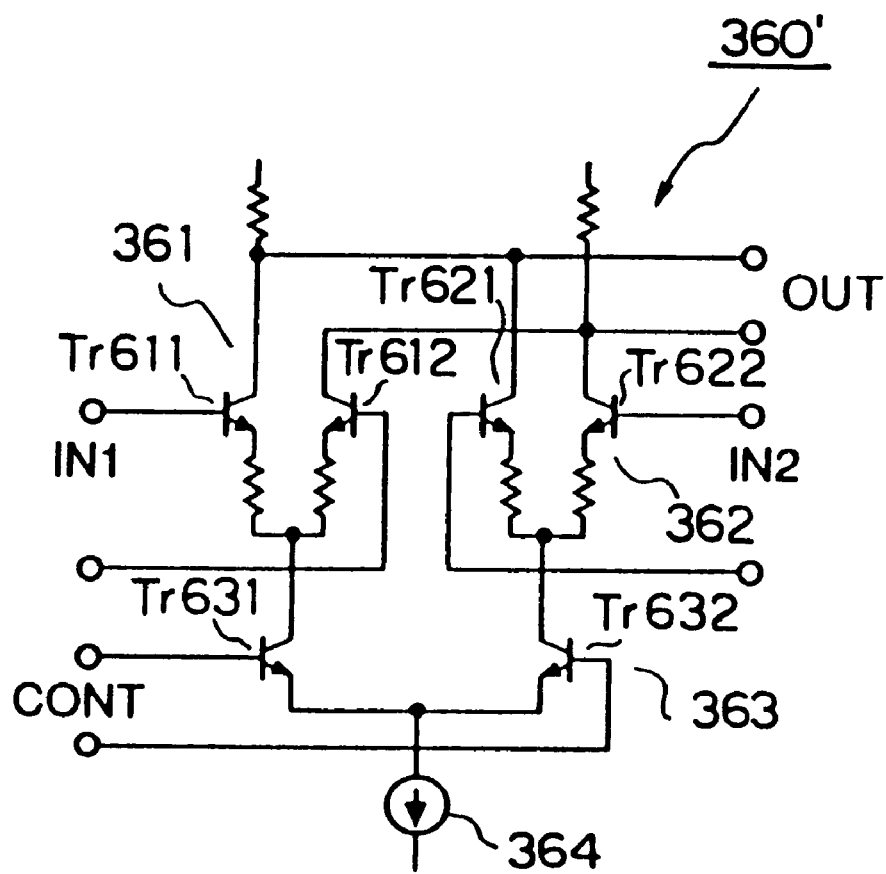
FIG. 6 is an example of an analog switch in the optical receiver according to the third embodiment of this invention.

Referring to FIG. 6, the description will proceed to an example of the analog switch unit 360. In FIG. 6, an analog switch circuit 360' is an example for explanation about the inner structure of the analog switch unit 360. The analog switch circuit 360' is an alternative type and comprises a differential amplifier 361 having transistors Tr611 and Tr61, a differential amplifier 362 having transistors Tr621 and Tr622, a differential amplifier 363 having transistors Tr631 and Tr632, and a driving current source 364. According to the illustrated construction, the analog switch circuit 360' can carry out the selecting operation for an analog signal having a frequency of several hundreds MHz and is operable at a high speed. The analog switch unit 360 can also carry out the selecting operation for the analog signal and is also operable at a high speed.

Referring back to FIG. 5, the limit amplifier circuits 310-1, 310-2, ..., and 310-n have offset compensation time constants τ(1), τ(2), ..., and τ(n), respectively. In this case, a relationship between two adjacent one of the the offset compensation time constants is defined by the following inequality represented by:

$$\tau(j) > \tau(j+1),$$

where j represents a positive integer smaller than n.

Herein, it is assumed that the optical receiver is used for receiving the burst signal. In this case, the analog switch unit 360 should select the output signal that is produced from the relatively forward one of the limit amplifier circuits 310-1 to 310-n. For example, when the selecting unit 360 selects the output signal of the limit amplifier circuit 310-2, the output signal amplified by each of the limit amplifier circuits 310-1 and 310-2 is delivered through the output terminal OUT as the amplified electrical signal. According to the selecting operation, the optical receiver has the offset compensation time constant of a small value and has the small number of the connection stages. As a result, the optical receiver enables a high speed response.

On the other hand, let the case that the optical receiver be used for receiving the continuous signal. The analog switch unit 360 should select the output signal of the limit amplifier circuits 310-1 to 310-n that is produced from a relatively rearward one of the limit amplifier circuits 310-1 to 310-n. For example, when the selecting unit 360 selects the output signal of the limit amplifier circuit 310-(n-1), each output signal amplified by the limit amplifier circuits 310-1 to 310-(n-1) is delivered through the output terminal OUT as the amplified electrical signal. According to the selecting operation, the preamplified electrical signal is amplified through the large number of the limit amplifier circuits. In this case, the optical receiver has the offset compensation time constant of a large value and the large number of the connection stages. As a result, the optical receiver can compensate the offset with high accuracy.

Fourth Embodiment

Figure 7:
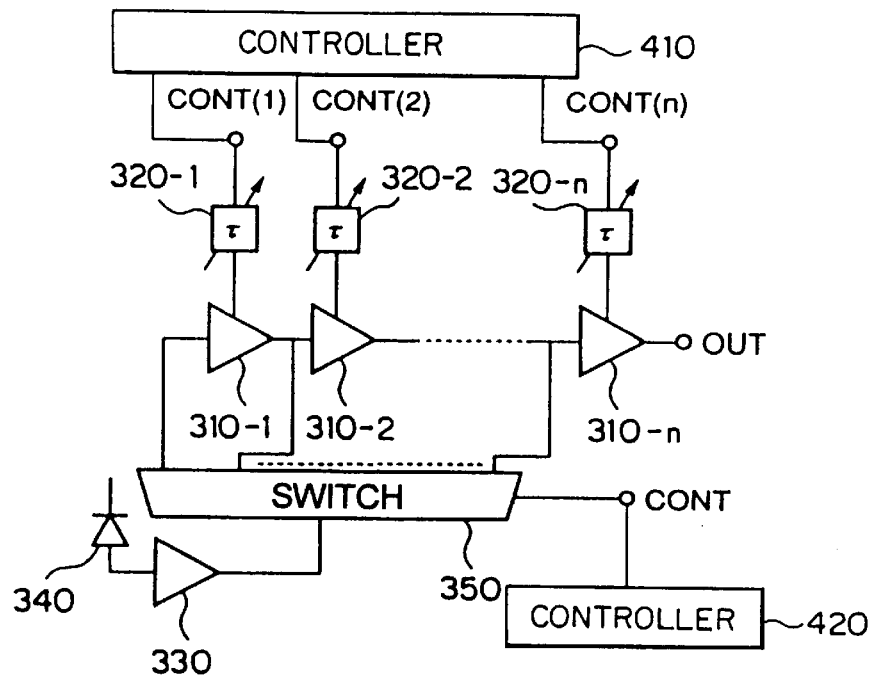
FIG. 7 is a block diagram of an optical receiver according to a forth embodiment of this invention.

Referring to FIG. 7, an optical receiver according to a fourth embodiment of this invention is a combination of the first and the second embodiments described in conjunction with FIGS. 3 and 4.

As is apparent from the description mentioned in conjunction with FIGS. 3, 4, and 6, the optical receiver has the adjusting function of the offset compensation time constant and the switching function of the number of the connection stages formed by the limit amplifier circuits 310-1 to 310-n.

Fifth Embodiment

Figure 8:
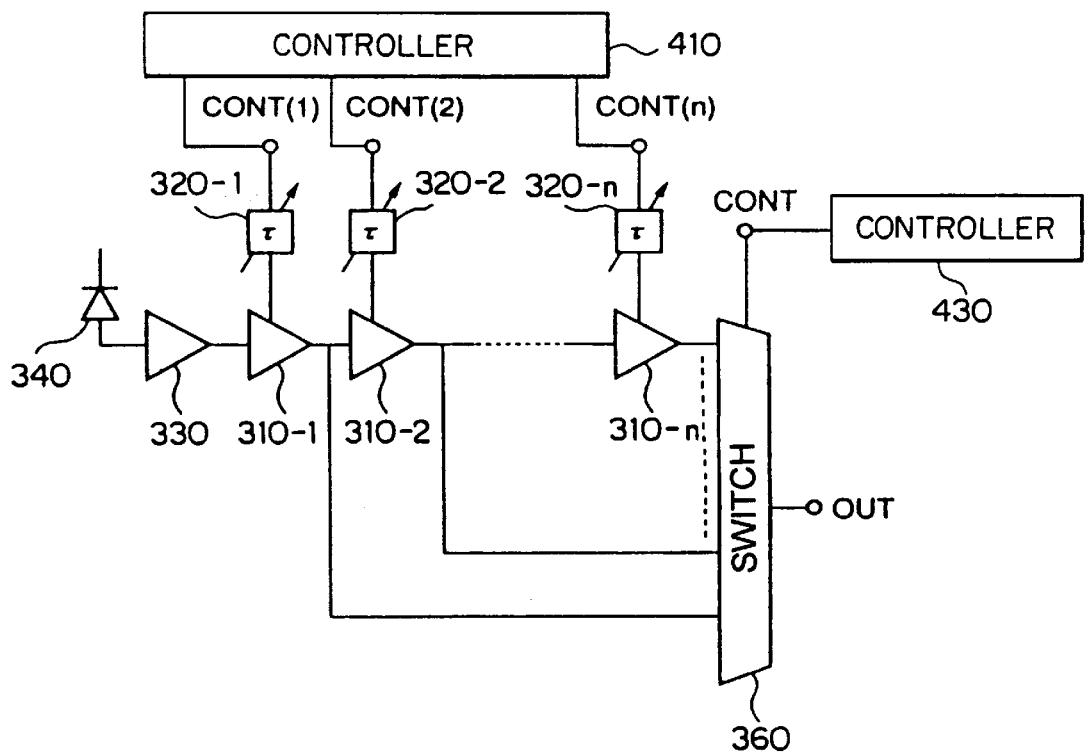
FIG. 8 is a block diagram of an optical receiver according to a fifth embodiment of this invention.

Referring to FIG. 8, an optical receiver according to a fifth embodiment of this invention is a combination of the first and the third embodiments described in conjunction with FIGS. 3 and 5.

As apparent from the description mentioned in conjunction with FIGS. 3, 5, and 6, the optical receiver has the adjusting function of the offset compensation time constant and the switching function of the number of the connection stages of the limit amplifier circuits 310-1 to 310-n.

Sixth Embodiment

According to a sixth embodiment of this invention, an optical receiver is similar in structure to those illustrated in connection with the first through the fifth embodiments except that the optical receiver is implemented by a semiconductor integrated circuit.

Figure 9:
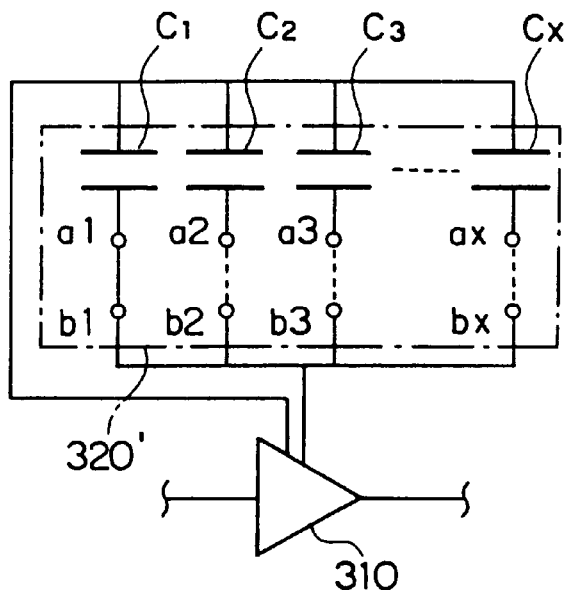
FIG. 9 is a block diagram of a single adjusting unit in an optical receiver according to a sixth embodiment of this invention.

The optical receiver according to the sixth embodiment is illustrated in FIG. 9 and is substantially equivalent to the first embodiment and has an adjusting circuit 320' representative of each of adjusting circuit 320-1 to 320-n formed by the semiconductor integrated circuit. More specifically, the adjusting circuit 320' is formed by wiring patterns which can change connections from one to another. In this case, the offset compensation time constant of a single limit amplifier circuit 310 representative of each of the limit amplifier circuits 310-1 to 310-n is adjusted by changing the connections of the wiring patterns between terminals a1, a2, a3, . . . , and ax coupled to capacitors C1, C2, C3, . . . , and Cx and terminals b1, b2, b3, . . . , and bx coupled to the single limit amplifier circuit 310, respectively.

Figure 10:
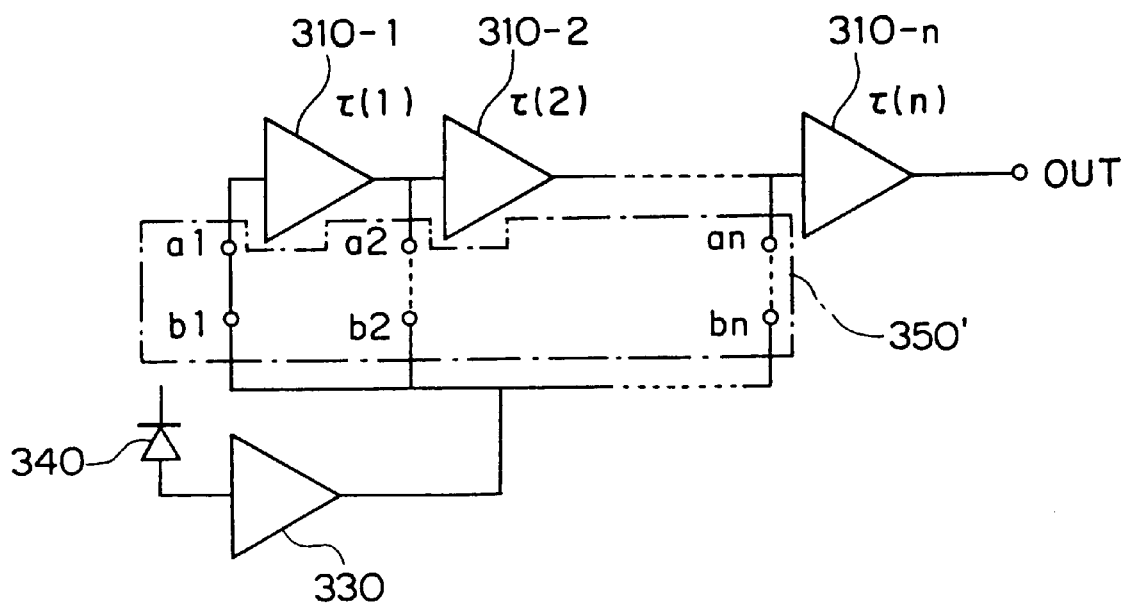
FIG. 10 is another block diagram of the optical receiver according to the sixth embodiment of this invention.

In FIG. 10, the selecting circuit 350' is implemented by the semiconductor integrated circuit including wiring patterns. In this case, one of the the limit amplifier circuits 310-1 to 310-n is selected by changing of connection of wiring patterns of the selecting circuit 350' between terminals b1, b2, . . . , and bn coupled to the preamplifier 330 and terminals a1, a2, . . . , and an coupled to the limit amplifier circuits 310-1 to 310-n.

Figure 11:
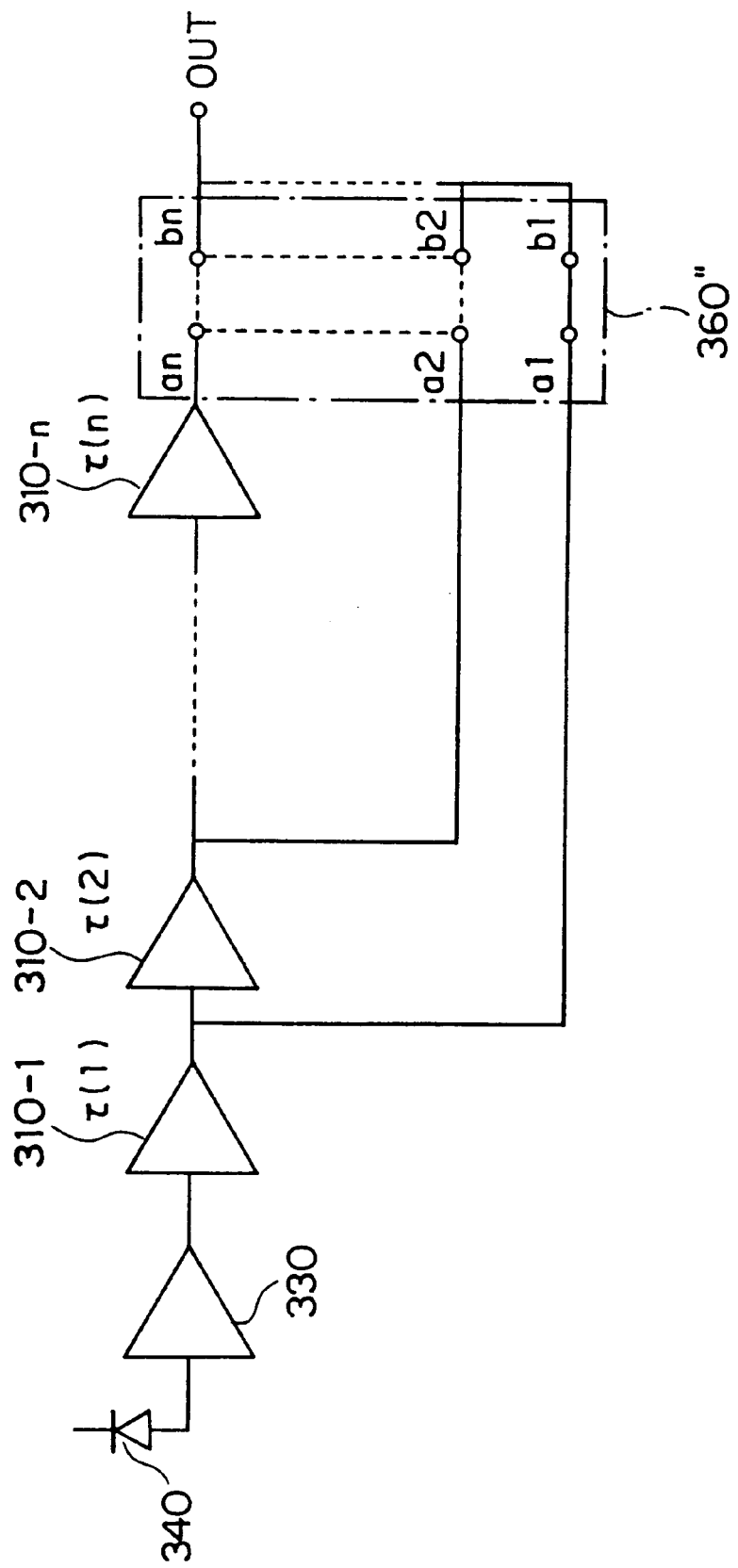
FIG. 11 is still another block diagram of the optical receiver according to the sixth embodiment of this invention.

In FIG. 11, in the semiconductor integrated circuit included in the third embodiment has a selecting circuit 360" formed by wiring patterns. In this case, one of the limit amplifier circuits 310-1 to 310-n is selected by changing of connections of the wiring patterns of the selecting circuit 360" between terminals a1, a2, . . . , and an coupled to the limit amplifier circuits 310-1 to 310-n and terminals b1, b2, . . . , and bn coupled to the output terminal OUT.

When a semiconductor integrated circuit is applied to the fourth or the fifth embodiments, at least one of the adjusting circuit and the selecting circuit may be formed by wiring patterns which can change connections from one to another.

At any rate, once when the wiring patterns or connections in the sixth embodiment are selected in the semiconductor integrated circuit, the offset compensation time constant is uniquely determined in the sixth embodiment.

Seventh Embodiment

An optical receiver according to a seventh embodiment of this invention is similar in structure to that illustrated in FIGS. 3, 5, and 8 except that no adjusting circuits 320-1 to 320-n are included in the optical receiver and, instead, at least one of the limit amplifier circuits themselves has offset compensation functions determined by controllable offset compensation time constants. Such a controllable limit amplifier circuits amplifies the electrical signal into an amplified and controlled electrical signal in dependency upon the controllable offset compensation time constant.

Figure 12:
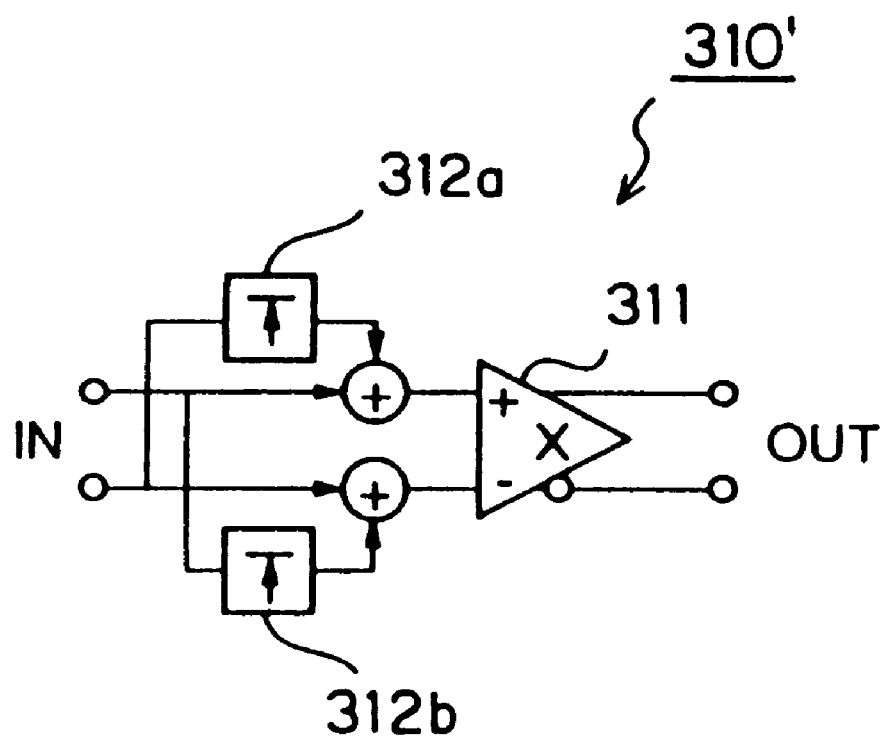
FIG. 12 is a circuit diagram of a single limit amplifier circuit in an optical receiver according to a seventh embodiment of this invention.

Referring to FIG. 12, the controllable limit amplifier circuit is specified by a single limit amplifier circuit 310' (suffixes omitted).

More specifically, the controllable limit amplifier circuit 310' comprises a differential amplifier 311, two peak detecting circuits 312a and 312b, and two adders (unnumbered). Each of the peak detecting circuits 312a and 312b comprises a peak hold capacitor (not shown) for holding a peak value. The offset compensation time constant in the controllable limit amplifier circuit 310' is adjusted in dependency upon a capacitance of the peak hold capacitor. In other words, the offset compensation time constant of the controllable limit amplifier circuit can be controlled by adjusting the capacitance in each circuit. Thus, the above-mentioned capacitor in each limit amplifier circuit serves to adjust the offset compensation time constant. This structure dispenses with the adjusting circuits 320-1 to 320-n, as illustrated in FIG. 3, 5, and 8.

What is claimed is:

1. An optical receiver operable in response to an input optical signal to produce an output electrical signal, said optical receiver comprising:

a photoelectric transducer for transducing said input optical signal into an electrical signal;

a plurality of limit amplifier circuits which are connected in series to one another and which have offset compensation functions determined by controllable offset compensation time constants, respectively, said plurality of limit amplifier circuits amplifying said electrical signal to produce an amplified and controlled electrical signal in dependency upon the offset compensation time constants controlled;

adjusting means connected to said plurality of limit amplifier circuits for adjusting at least one of said offset compensation time constants to make the limit amplifier circuits produce said amplified and controlled electrical signal; and output means for producing said amplified and controlled electrical signal as said output electrical signal.

2. An optical receiver as claimed in claim 1, wherein said adjusting means comprises:
    a plurality of adjusting circuits which are connected to the limit amplifier circuits to adjust the offset compensation time constants of the limit amplifier circuits, respectively.

3. An optical receiver as claimed in claim 2, wherein:
    each of said adjusting circuits has a controllable time constant which serves to determine each of the offset compensation time constants in each of the limit amplifier circuits.

4. An optical receiver as claimed in claim 3, wherein said adjusting means comprises:
    control means for supplying a control signal to each of said adjusting circuits to control the controllable time constant in each adjusting circuit.

5. An optical receiver as claimed in claim 1, wherein each of the limit amplifier circuits comprises a peak detecting circuit for holding a peak value and a differential amplifier connected to said peak detecting circuit.

6. An optical receiver as claimed in claim 1, wherein said optical receiver is implemented by a semiconductor integrated circuit, said adjusting means being formed by wiring patterns.

7. An optical receiver operable in response to an input optical signal to produce an output electrical signal, said optical receiver comprising:
    a photoelectric transducer for transducing said input optical signal into an electrical signal;
    first through n-th limit amplifier circuits which are connected in series to one another to form first through n-th connection stages, respectively, and which have offset compensation functions determined by offset compensation time constants, said first through said n-th limit amplifier circuits amplifying said electrical signal supplied to one of the first through the n-th limit amplifier circuit to produce an amplified electrical signal through the n-th limit amplifier circuits;
    selecting means supplied with the electrical signal and coupled to the first through the n-th limit amplifier circuits for selecting one of the first through the n-th limit amplifier circuits as a selected limit amplifier circuit to change the number of the limit amplifier circuits between the selected limit amplifier circuit and the n-th limit amplifier circuit and to deliver the electrical signal to the selected limit amplifier circuit; and
    output means for delivering the output electrical signal from the n-th limit amplifier circuit by amplifying the electrical signal between the selected limit amplifier circuit and the n-th limit amplifier circuit.

8. An optical receiver as claimed in claim 7, wherein each of the first through the n-th limit amplifier circuits has input and output terminals;
    said selecting means being connected to the input terminals of the first through the n-th limit amplifier circuits.

9. An optical receiver as claimed in claim 7, wherein said selecting means comprises:
    an analog switch which has an input port and first through n-th output ports and which connects said input port to a selected one of the first through the n-th output ports to deliver the electrical signal from the input port to the selected limit amplifier circuit.

10. An optical receiver as claimed in claim 9, wherein said selecting means comprises control means for supplying a control signal to said analog switch to control a connection and delivering therein.

11. An optical receiver as claimed in claim 7, wherein each of said first through said n-th limit amplifier circuits comprises a peak detecting circuit for holding a peak value and a differential amplifier connected to said peak detecting circuit.

12. An optical receiver as claimed in claim 7, wherein said optical receiver is implemented by a semiconductor integrated circuit, said selecting means being formed by wiring patterns.

13. An optical receiver operable in response to an input optical signal to produce an output electrical signal, said optical receiver comprising:
    a photoelectric transducer for transducing said input optical signal into an electrical signal;
    first through n-th limit amplifier circuits which are connected in series to one another to form first through n-th connection stages, respectively, and which have offset compensation functions determined by offset compensation time constants, said first through said n-th limit amplifier circuits amplifying said electrical signal supplied to the first limit amplifier circuit to produce an amplified electrical signal through one of the first through the n-th limit amplifier circuits;
    selecting means coupled to the first through the n-th limit amplifier circuits for selecting one of the first through the n-th limit amplifier circuits as a selected limit amplifier circuit to change the number of the limit amplifier circuits between the first limit amplifier circuit and the selected limit amplifier circuit and to deliver the amplified electrical signal from the selected limit amplifier circuit; and
    output means for delivering the output electrical signal from the selected limit amplifier circuit by amplifying the electrical signal between the first limit amplifier circuit and the selected limit amplifier circuit.

14. An optical receiver as claimed in claim 13, wherein each of the first through the n-th limit amplifier circuits has input and output terminals;
    said selecting means being connected to the output terminals of the first through the n-th limit amplifier circuits.

15. An optical receiver as claimed in claim 14, wherein said selecting means comprises:
    an analog switch which has first through n-th input ports and an output port and which connects a selected one of the first through the n-th input ports to said output port to deliver the electrical signal from the selected limit amplifier circuit to the output port.

16. An optical receiver as claimed in claim 15, wherein said selecting means comprises control means for supplying a control signal to said analog switch to control a connection and delivering therein.

17. An optical receiver as claimed in claim 13, wherein each of said first through said n-th limit amplifier circuits comprises a peak detecting circuit for holding a peak value and a differential amplifier connected to said peak detecting circuit.

18. An optical receiver as claimed in claim 13, wherein said optical receiver is implemented by a semiconductor integrated circuit, said selecting means being formed by wiring patterns.

19. An optical receiver operable in response to an input optical signal to produce an output electrical signal, said optical receiver comprising;

a photoelectric transducer for transducing said input optical signal into an electrical signal;

first through n-th limit amplifier circuits which are connected in series to one another to form first through n-th connection stages, respectively, and which have offset compensation functions determined by controllable offset compensation time constants, said first through said n-th limit amplifier circuits amplifying said electrical signal supplied to one of the first through the n-th limit amplifier circuits to produce an amplified and controlled electrical signal through the n-th limit amplifier circuit in dependency upon the offset compensation time constants controlled;

adjusting means connected to said first through said n-th limit amplifier circuits for adjusting at least one of said offset compensation time constants to make the limit amplifier circuits produce said amplified and controlled electrical signal;

selecting means supplied with the electrical signal and coupled to the first through the n-th limit amplifier circuits for selecting one of the first through the n-th limit amplifier circuits as a selected limit amplifier circuit to change the number of the limit amplifier circuits between the selected limit amplifier circuit and the n-th limit amplifier circuit and to deliver the electrical signal to the selected limit amplifier circuit; and output means for delivering the output electrical signal from the n-th limit amplifier circuit by amplifying and adjusting the electrical signal between the selected limit amplifier circuit and the n-th limit amplifier circuits.

20. An optical receiver operable in response to an input optical signal to produce an output electrical signal, said optical receiver comprising:

a photoelectric transducer for transducing said input optical signal into an electrical signal;

first through n-th limit amplifier circuits which are connected in series to one another to form first through n-th connection stages, respectively, and which have offset compensation functions determined by controllable offset compensation time constants, said first through said n-th limit amplifier circuits amplifying said electrical signal supplied to the first limit amplifier circuit to produce an amplified and controlled electrical signal through one of the first through the n-th limit amplifier circuits in dependency upon the offset compensation time constants controlled;

adjusting means connected to said first through said n-th limit amplifier circuits for adjusting at least one of said offset compensation time constants to make the limit amplifier circuits produce said amplified and controlled electrical signal;

selecting means coupled to the first through the n-th limit amplifier circuits for selecting one of the first through the n-th limit amplifier circuits as a selected limit amplifier circuit to change the number of the limit amplifier circuits between the first limit amplifier circuit and the selected limit amplifier circuit and to deliver the amplified and controlled electrical signal from the selected limit amplifier circuit; and output means for delivering the output electrical signal from the selected limit amplifier circuit by amplifying and adjusting the electrical signal between the first limit amplifier circuit and the selected limit amplifier circuit.

21. An optical receiver operable in response to an input optical signal to produce an output electrical signal, said optical signal receiver comprising:

a photoelectric transducer for transducing said input optical signal into an electrical signal;

a plurality of limit amplifier circuits which are connected in series to one another and which have offset compensation functions determined by offset compensation time constants, respectively, at least one of which is controllable, said plurality of the limit amplifier circuits amplifying said electrical signal to produce an amplified and controlled electrical signal in dependency upon the offset compensation time constants controlled; and output means for producing said amplified and controlled electrical signal as said output electrical signal.

22. An optical receiver as claimed in claim 21, wherein each of the limit amplifier circuits comprises a peak detecting circuit for holding a peak value and a differential amplifier connected to said peak detecting circuit;

said peak detecting circuit having the controllable offset compensation time constant.

23. An optical receiver as claimed in claim 22, wherein said peak detecting circuit has a capacitor which determines the controllable offset compensation time constant.

* * * * *